United States Patent Office 2,746,907
Patented May 22, 1956

2,746,907

PROCESS FOR HYDRO-DESULFURIZATION OF LIGHT HYDROCARBONS USING A NICKEL OXIDE CATALYST

Ross A. Hanson, Fullerton, Calif., assignor to Union Oil Company of California, Los Angeles, Calif., a corporation of California No Drawing. Application January 11, 1952,
Serial No. 266,104

2 Claims. (Cl. 196—28)

This invention relates to the catalytic desulfurization of light petroleum fractions. It is concerned more specifically with desulfurization processes employing as catalysts nickel oxide on a carrier. The critical features of this invention reside in the discovery of certain reaction conditions which are found to result in an optimum economy of operation correlated with an optimum efficiency of sulfur removal. These conditions will be more particularly delineated hereinafter.

Gasoline, and other light fractions obtained from high sulfur crudes such as those from the Santa Maria fields of Central California have long been an important problem to the refiner. Besides the difficulties involved in handling, these hydrocarbons have undesirable properties such that they are only useful after removal of most of the sulfur.

The difficulties are particularly pronounced with sour cracked gasolines which are more difficult to desulfurize than straight run gasolines. The most practiced commercial process is known as acid treating and it has the distinct disadvantage of not only lowering the quality of the product as judged by octane number but it also involves considerable loss of product.

Mercaptans in gasoline may be converted into disulfides by the process known as "doctor sweetening" and other similar processes. However, the disulfides are not removed but largely remain dissolved in the gasoline resulting in only slight sulfur reduction and generally in a lowering of octane number.

Newer solvent methods such as the "solutizer" and similar processes actually remove mercaptans from gasoline which results in an increase in lead susceptibility, as well as the desired sweetening. These processes do not remove other types of sulfur compounds which are allowed to remain in the product.

Catalytic desulfurization methods, wherein the petroleum fraction is contacted, usually in the vapor phase, with a solid catalyst at elevated temperatures and pressures, and with generally large amounts of added hydrogen, can effectively remove a large proportion of total sulfur. These methods are therefore coming into wider use in spite of certain disadvantages accruing thereto. Important disadvantages include the expense involved in providing equipment for high pressure operation and the difficulty and expense involved in supplying sufficient hydrogen to the reaction.

It is accordingly an object of this invention to catalytically desulfurize light petroleum stocks at low pressures, ranging from atmospheric to about 100 pounds per square inch, whereby such stocks may be treated in low-pressure equipment.

Another object of the invention is to reduce the hydrogen recycle and consumption rate necessary to obtain effective catalytic desulfurization.

A further object is to provide certain catalysts which are most amenable to the particular reaction conditions employed.

These and other objects are achieved by the process of the present invention. This process consists essentially in:

1. Vaporizing the petroleum fraction to be treated and bringing it to the desired reaction temperature.
2. Passing the vaporized feed material into a catalyst contacting zone maintained at a temperature between about 600 to 700° F., and at a pressure from atmospheric to about 150 p. s. i. g. (pounds per square inch gage), and controlling the time of contact so that the liquid hourly space velocity (volumes of liquid feed per volume of catalyst per hour) does not exceed about 3.0 and controlling the ratio of feed to catalyst to give a total catalyst/oil ratio of between about 0.3 and 2.0.
3. Passing hydrogen into the reaction zone with the gaseous feed at a rate not exceeding about 300 s. c. f. of hydrogen per barrel of feed.
4. Regenerating the catalyst by heating with oxygen containing gases after the permissible amount of feed has been contacted therewith.

Manifestly, many specific variations of the above general procedures may be employed, some of which will be outlined hereinafter.

FEED MATERIALS

The feed materials may comprise any suitable low boiling petroleum fraction including straight run, natural gasolines, or cracked stocks. The sulfur content may range from 0.1% to 4.0%. For purposes of this application, the term "low boiling fraction" may be defined as those normally liquid petroleum fractions having an ASTM end point up to about 550–600° F. This includes gasoline and naphthas primarily. Low boiling fractions of coal tar and shale oils may likewise be treated. The higher boiling fractions generally require reaction conditions outside the scope of this invention.

CATALYSTS

It is preferred that the nickel oxide be supported on a carrier. Suitable carriers include, for example, Filtrol clay, kieselguhr, silica gel, alumina, aluminum silicates, and bauxite. The amount of metal oxide on the carrier may be varied considerably, for example, from about 2% to 70%. The reaction conditions of the present process are found to be especially propitious for the use of inexpensive clay carriers such as Filtrol, which is an acid-washed montmorillonite clay, or Porocel, which is a natural bauxite. Such clays are known to have considerable carbon-to-carbon bond cracking tendencies in hydrocarbon conversion processes, but the reaction conditions of the present process are found to reduce these tendencies to a minimum.

In the preferred method for the preparation of the catalyst, an impregnation step is employed wherein the dried carrier is immersed in a solution of the desired metal salt or salts. The impregnated carrier is thereafter separated from the solution, dried and calcined in order to convert the metal salt to its oxide.

Prior to the impregnation step, the carrier is normally shaped into the physical form desired for the catalyst. For this purpose the dried carrier is usually ground, mixed with a lubricant such as graphite and/or hydrogenated vegetable oil, and pilled. The carrier is then normally activated by heating at 750°–1625° F. for two to six hours, for example. Such a pilled catalyst carrier is suitable for the continuous moving bed type reactors preferred for the present process. Alternatively, the carrier may be used in granular form, or it may be ground into powder, made into a paste and extruded. In fluidized catalyst processes the carrier, either before or after impregnation, is formed into a finely divided state as in micro-bead form, or it is ground into a fine state, and thereafter calcined to oxidize the metal salt.

The metal salt impregnation solution is preferably an aqueous solution of one or more metal salts, such as nickel nitrate. The concentration of metal in the solution will depend upon the particular carrier being employed and upon the desired concentration of metal on the finished catalyst. In using nickel, I prefer to provide about 2% to 70% of nickel in the final catalyst. For this purpose, the impregnation solution may contain between about 35 and 120 gms. of nickel nitrate per 100 ml. of solution. The higher concentrations of active metal on the catalyst may be obtained by multiple impregnation or coprecipitation. Coprecipitation methods may likewise be employed for lower concentrations of metal.

In the impregnation of the carrier with a metal salt, the activated carrier is immersed in the impregnation solution for a short time, such as between about 2 minutes and 60 minutes, for example. A more uniform penetration of the impregnation solution is obtained with longer impregnation periods. After immersion in the impregnation solution, a part of the solution is sorbed by the carrier, and the excess is thereafter removed. The impregnated carrier, after draining and drying in a low temperature oven, such as at 180 to 230° F., for example, is activated by heating to a temperature of 800 to 1200° F. for 2 to 6 hours, with added oxygen if necessary. Oxygen containing gases may be desirable, for example, if the impregnation salts do not readily decompose to oxides.

Although the impregnation method described hereinbefore is the preferred method for adding the metal salts to the carrier, other methods may be employed such as coprecipitation and copilling. Thus, a hydrous alumina gel or Filtrol may be miexd with an aqueous solution of nickel nitrate, for example, and the mixture dried at 200 to 300° F. for example, to obtain the catalyst composite.

In using metal oxides without a carrier, the desired salts may simply be calcined to form the active oxides, or they may be first precipitated as hydroxides and then dried and calcined.

Suitable catalysts may suitably be prepared as follows:

Example I

A nickel nitrate impregnation solution was prepared by dissolving about 400 gms. of $Ni(No_3)_2 \cdot 6H_2O$ in sufficient distilled water to give 500 ml. of solution. About 400 gms. of granular Filtrol was immersed in the impregnation solution fo about 30 minutes, drained, dried at about 250° F. and further activated by heating to about 1000° F. for several hours. The catalyst so prepared contained about 10% by weight of nickel oxide. This is designated catalyst No. 1.

Example II

A nickel-Porocel catalyst was prepared by substituting an equivalent amount of dry, commercial, 3/16" pelleted Porocel for the Filtrol of Example I. The 10% NiO-Porocel was designated catalyst No. 2.

REACTION CONDITIONS

In accordance with the principal objectives of my invention, it is desired to maintain as low a hydrogen recycle and hydrogen consumption rate, and also to keep the pressures as low as may be compatible with adequate desulfurization. The normal reaction conditions previously employed for catalytic desulfurization embrace temperatures between about 600–900° F., pressures of about 200–1000 p. s. i. g., hydrogen recycle rates of about 1,000 to 10,000 cubic feet per barrel of feed, liquid hourly space velocities between about 1 to 10, and catalyst/oil ratios of about .01 or less to about 0.1 by weight. The high hydrogen requirements and high pressures are serious operational handicaps, both from the standpoint of economy and ease of controlling the process. These conditions have, however, been considered necessary in order to accelerate desulfurization and inhibit cracking. Adequate repression of cracking tendencies has been thought to require both high hydrogen pressures and high total pressures. The present invention is based upon the discovery that good catalytic desulfurization may be obtained without appreciably increasing the amount of cracking (i. e., without appreciably decreasing the liquid yield) by employing a combination of reaction conditions including low total pressures, low hydrogen partial pressures, and relatively high catalyst/oil ratios, all resulting in low hydrogen consumption.

It is desired to conduct the desulfurization operation at pressures ranging from atmospheric to about 150 p. s. i. g. Ordinarily, under prior art procedures, such pressures result in slow and incomplete desulfurization and considerable cracking. However, under the conditions employed herein, such low pressures are found to give good results. In addition to permitting the use of low pressure equipment, these pressures also permit the direct injection of the usual hydrogen-containing off-gases from a hydroforming operation, for example, into the desulfurizing operation without intermediate repressuring. Such hydroforming or reforming off-gases, as usually produced, are at about 100 p. s. i. g. pressure. The high pressure operations previously employed have necessitated repressuring of these gases for use in desulfurization. On the other hand, optimum results under the conditions herein employed are obtainable at the preferred pressure of about 50–100 p. s. i. g.

The hydrogen requirement for my process is found to range between about 100 to 400 cubic feet per barrel of feed, and preferably below 300. The amount will vary within these limits depending upon the amount of sulfur in the feed stock, its relative unsaturation, the temperature of the reaction, and the catalyst/oil ratio. No precise limitations can be specified in view of the various types of feed encountered. The optimum hydrogen supply should be determined by actual test with the specific feed stocks. The low partial pressures of hydrogen are found to effectively promote desulfurization reaction, as opposed to hydrocarbon cracking, hydrogenation and dehydrogenation reactions, when the catalyst/oil ratio is sufficiently high.

I have found that in order to operate at the total pressures and partial hydrogen pressures indicated above, it is necessary to contact the feed with not less than about 0.2 its weight of catalyst. Conversely the catalyst should be contacted with not more than about 5 weight units of feed. This lower limit of .2 weight units of catalyst is ordinarily practicable only when the feedstock is low in sulfur, for example below 0.5%; for high sulfur stocks, the lower limit is about 0.3–0.4 unit of catalyst per unit of feed. In general, the higher the ratio of catalyst to feed, the more selective will be the desulfurization action as opposed to other hydrocarbon conversion reactions such as dealkylation, dehydrogenation, hydrogenation and various carbon-to-carbon bond splitting reactions. Increasing the ratio of catalyst to feed hence increases the efficiency of the conversion.

The upper limit of catalyst per unit weight of feed is normally dictated by practical considerations of economy. It is ordinarily desirable to use the minimum amount of catalyst necessary for adequate conversion, in order to minimize the heat requirements for regeneration, as well as total catalyst attrition and loss. In the present case, however, it is found that the slight increase in catalyst cost brought about by employing larger amounts thereof, and the slight increase in heat requirements for regeneration are more than offset by the advantages gained in reducing the hydrogen consumption and operating pressures. These advantages are generally obtained to a sufficient degree to offset the higher catalyst costs at any ratio of catalyst to oil between about 0.2 and 2.0. Specific differences in feed materials and catalysts may, however, necessitate some variation in these limits.

When the catalyst has contacted the desired amount of feed, it is then regenerated by heating with an oxygen containing gas at temperatures between about 900–1200° F. In a continuous moving bed type of reactor the regeneration is ordinarily continuous, and the catalyst merely circulates through a reaction zone and a regeneration zone at a rate which determines the catalyst/oil ratio. In cyclic processes employing static type contact beds, the catalyst/oil ratio is ordinarily determined by the on-stream period of each bed, after which the particular bed is taken off stream and regenerated. In either type process, the catalyst may be "fluidized" if desired.

The liquid hourly space velocity (LHSV) is defined as volumes of liquid feed per volume of catalyst per hour. This factor, when correlated with the pressure, temperature and feed composition, determines the reaction time or "contact time." The space velocities employed herein may vary between about 0.5 and 3, but are preferably maintained within the limits of about 0.75 and 2.0. Within these limits the specific space velocity depends upon the other process variables such as feed composition, temperature, pressure, oil/catalyst ratio, and the hydrogen partial pressure. Low sulfur content in the feed, higher pressures, higher hydrogen partial pressures, higher temperatures, and higher catalyst/oil ratios all favor the use of the higher space velocities.

The following examples will serve to illustrate suitable combinations of process variables which may be employed. However, these examples should not be interpreted as limitative, since the reaction conditions may be varied as indicated above.

Example III

A blend of cracked gasolines obtained from California crudes and boiling up to 400° F. was vaporized and passed with hydrogen over three different contact beds consisting of the 10% NiO-Filtrol catalyst of Example I above. The temperature of reaction was 725° F., the rate of hydrogen addition was 200 cubic feet per barrel of feed, the liquid hourly space velocity was 1, and the catalyst/oil ratio by weight was 1. The pressure employed in the three contact beds was varied between 0 and 100 p. s. i. g. The results were as follows:

|  | Feed | Bed 1 | Bed 2 | Bed 3 |
|---|---|---|---|---|
| Pressure, p. s. i. g. |  | 0 | 50 | 100 |
| Liquid Yield, Vol. Percent Feed |  | 88 | 87 | 89 |
| $C_5$—330° F. Fraction: |  |  |  |  |
| Nitrogen, Wt. Percent | 0.019 | 0.010 | 0.003 | 0.004 |
| Sulfur, Wt. Percent | 0.24 | 0.19 | 0.13 | 0.04 |
| Oct. No., F-1+3 ml. TEL | 97.5 | 98.0 | 98.0 | 96.5 |
| 330–400° F. Fraction: |  |  |  |  |
| Nitrogen, Wt. Percent | 0.066 | 0.024 | 0.013 | 0.013 |
| Sulfur, Wt. Percent | 0.35 | 0.24 | 0.17 | 0.05 |

The above data show that the mild reaction conditions give effective desulfurization and denitrogenation without appreciably affecting the octane rating.

Example IV

A nickel oxide-Filtrol catalyst containing 20% nickel oxide was prepared by the method of Example I employing a proportionately more concentrated solution of nickel nitrate for impregnation. Two beds of the calcined catalyst were prepared and the same feed stock employed in Example III was passed with hydrogen through each bed under the same reaction conditions as Example VI. The results were as follows:

|  | Feed | Bed 1 | Bed 2 |
|---|---|---|---|
| Temp., °F. |  | 725 | 630 |
| Liquid Yield, $C_4$+Vol. Percent feed |  | 87.5 | 90.7 |
| $C_4$—330° F. Fraction: |  |  |  |
| Nitrogen, Wt. Percent | 0.017 | 0.002 | 0.002 |
| Sulfur, Wt. Percent | 0.26 | 0.08 | 0.08 |
| Olefines, Vol. Percent | 62 | 31 | 19 |
| Octane No., F-1+3 ml. TEL | 96.5 | 97.0 | 95.0 |
| 330–400° F. Fraction: |  |  |  |
| Nitrogen, Wt. Percent | 0.095 | 0.008 | 0.006 |
| Sulfur, Wt. Percent | 0.39 | 0.09 | 0.10 |

This data shows that nickel on Filtrol permits optimum desulfurization with optimum liquid yields at temperatures around 630° F., higher temperatures resulting in lower liquid yields. It is hence preferred to employ temperatures between about 600 to 700° F. for nickel oxide catalysts.

Example V

The feed stock of Example III was passed over a bed of the 10% NiO-Porocel catalyst of Example II. The reaction conditions were: pressure 100 p. s. i. g., temperature 725° F., hydrogen addition 200 s. c. f./bbl. feed, catalyst/oil ratio 1, liquid hourly space velocity 1. A 93% liquid yield was obtained, and the sulfur in the $C_5$-330° F. fraction was reduced from 0.24 to 0.07 wt. percent; the sulfur in the 330–400° F. fraction was reduced from 0.35% to 0.08%.

Example VI

A coprecipitated, activated alumina-silica gel containing 95% $Al_2O_3$ and 5% $SiO_2$ was immersed for about 20 minutes in a nickel nitrate solution of suitable strength to provide about 10% of NiO on the final catalyst, drained, dried at about 250° F. and activated by heating to about 1000° F. Two beds of the resulting catalyst were prepared, and the feed stock of Example V was passed through each bed under the following reaction conditions: temperature 725° F., pressure 100 p. s. i. g., hydrogen addition 200 s. c. f./bbl. feed, and liquid hourly space velocity 1. The catalyst/oil ratio differed for each bed as indicated in the following tabulation of results:

|  | Feed | Bed 1 | Bed 2 |
|---|---|---|---|
| Catalyst/oil Wt. ratio |  | 1.1 | 0.4 |
| Liquid Yield, $C_4$+Vol. Percent feed |  | 92 | 95 |
| $C_4$—330° F. Fraction: |  |  |  |
| Nitrogen, Wt. Percent | 0.017 | 0.002 | 0.002 |
| Sulfur, Wt. Percent | 0.26 | 0.06 | 0.11 |
| Octane No., F-1+3 ml. TEL | 96.5 | 96 | 96 |
| 330–400° F. Fraction: |  |  |  |
| Nitrogen, Wt. Percent | 0.095 | .003 | .005 |
| Sulfur, Wt. Percent | 0.39 | .07 | .15 |

This experiment shows that decreasing the catalyst/oil ratio below 1.0 effects a decrease in the desulfurization achieved under the reaction conditions employed herein. It is hence preferred not to reduce the catalyst/oil ratio below about 0.5. It should be noted that if a feed stock lower in sulfur than that employed in this example is treated, the above catalyst/oil ratio of 0.4 would give better desulfurization. It is therefore practical to employ catalyst/oil ratios as low as about 0.3 in some cases.

It should be understood that the catalysts employed in the above examples were all in granular or pilled form, from about 1/8 to 1/4 inch mesh. Similar results are obtained with powdered catalysts. If an active metal oxide is employed alone without a carrier, slightly lower catalyst/oil ratios may be employed, for example, down to about 0.2 for catalysts comprising above about 80% active metal oxides.

Having now fully described my invention in such manner as to enable others skilled in the art to practice it, I do not wish to be limited to the specific details disclosed, but only to the broad aspects as set forth in the following claims.

I claim:

1. A process for desulfurizing a cracked gasoline containing between about 0.1% and 4% sulfur at low total pressures and low hydrogen pressures without substantial destructive cracking, which comprises contacting a mixture of hydrogen and said gasoline with a desulfurization catalyst consisting essentially of (1) between about 10% and 20% by weight of nickel oxide and (2) between about 90% and 80% by weight of an acid-washed, montmorillonite clay carrier, said contacting being carried out at a temperature between about 600° and 700° F., a pressure between about 50 and 150 p. s. i. g., a hydrogen ratio between about 100 and 400 s. c. f. per barrel of feed, and a space velocity between about 0.5 and 3 volumes of feed per volume of catalyst per hour, continuing said contacting until said catalyst has contacted between about 0.5 and 2.0 parts by weight of gasoline, then terminating said contacting and heating the catalyst in the presence of an oxygen-containing gas at a temperature between about 900° and 1200° F., and contacting the regenerated catalyst with further quantities of said gasoline under the stated conditions.

2. A process as defined in claim 1 wherein said space velocity is about 1.

References Cited in the file of this patent

UNITED STATES PATENTS

| Number | Name | Date |
|---|---|---|
| 2,516,876 | Horne | Aug. 1, 1950 |
| 2,528,586 | Ford | Nov. 7, 1950 |
| 2,560,415 | Cornell | July 10, 1951 |
| 2,560,433 | Gilbert et al. | July 10, 1951 |
| 2,573,726 | Porter et al. | Nov. 6, 1951 |
| 2,574,450 | Porter et al. | Nov. 6, 1951 |
| 2,574,451 | Porter et al. | Nov. 6, 1951 |
| 2,577,823 | Stine | Dec. 11, 1951 |
| 2,600,362 | Stiles | Dec. 21, 1952 |
| 2,604,436 | Adey et al. | July 22, 1952 |
| 2,606,141 | Myer | Aug. 5, 1952 |